United States Patent [19]

Wada

[11] Patent Number: 4,866,939
[45] Date of Patent: Sep. 19, 1989

[54] METHOD AND APPARATUS FOR EXTRACTING GEOTHERMAL FLUID

[75] Inventor: Sabro Wada, Shimousa, Japan

[73] Assignee: Japan Oil Engineering Company, Ltd., Tokyo, Japan

[21] Appl. No.: 158,295

[22] Filed: Feb. 19, 1988

Related U.S. Application Data

[63] Continuation-in-part of Ser. No. 930,793, Nov. 13, 1986, abandoned.

[30] Foreign Application Priority Data

Dec. 3, 1985 [JP] Japan .................. 60-272168

[51] Int. Cl.⁴ .............................................. F03G 7/00
[52] U.S. Cl. .................................. 60/641.2; 166/266; 166/303; 166/372

[58] Field of Search ................ 60/641.2, 641.3, 641.4, 60/641.5; 166/266, 303, 372

Primary Examiner—Allen M. Ostrager
Attorney, Agent, or Firm—Frishauf, Holtz, Goodman & Woodward

[57] ABSTRACT

A method and an apparatus for extracting geothermal fluid are disclosed. Pressurized and superheated steam is injected into a hot water region below the flashing point of the hot water in the well so as to lower the level of said flashing point in the well, while the well head pressure of a production well drilled into a water-dominated geothermal reservoir is held constant. As a result of this injection, the pressure of water head in the well relative to the pressure of the geothermal reservoir fluid is significantly reduced and both the extraction of connate water and the production of steam at the well head are remarkably enhanced.

4 Claims, 6 Drawing Sheets

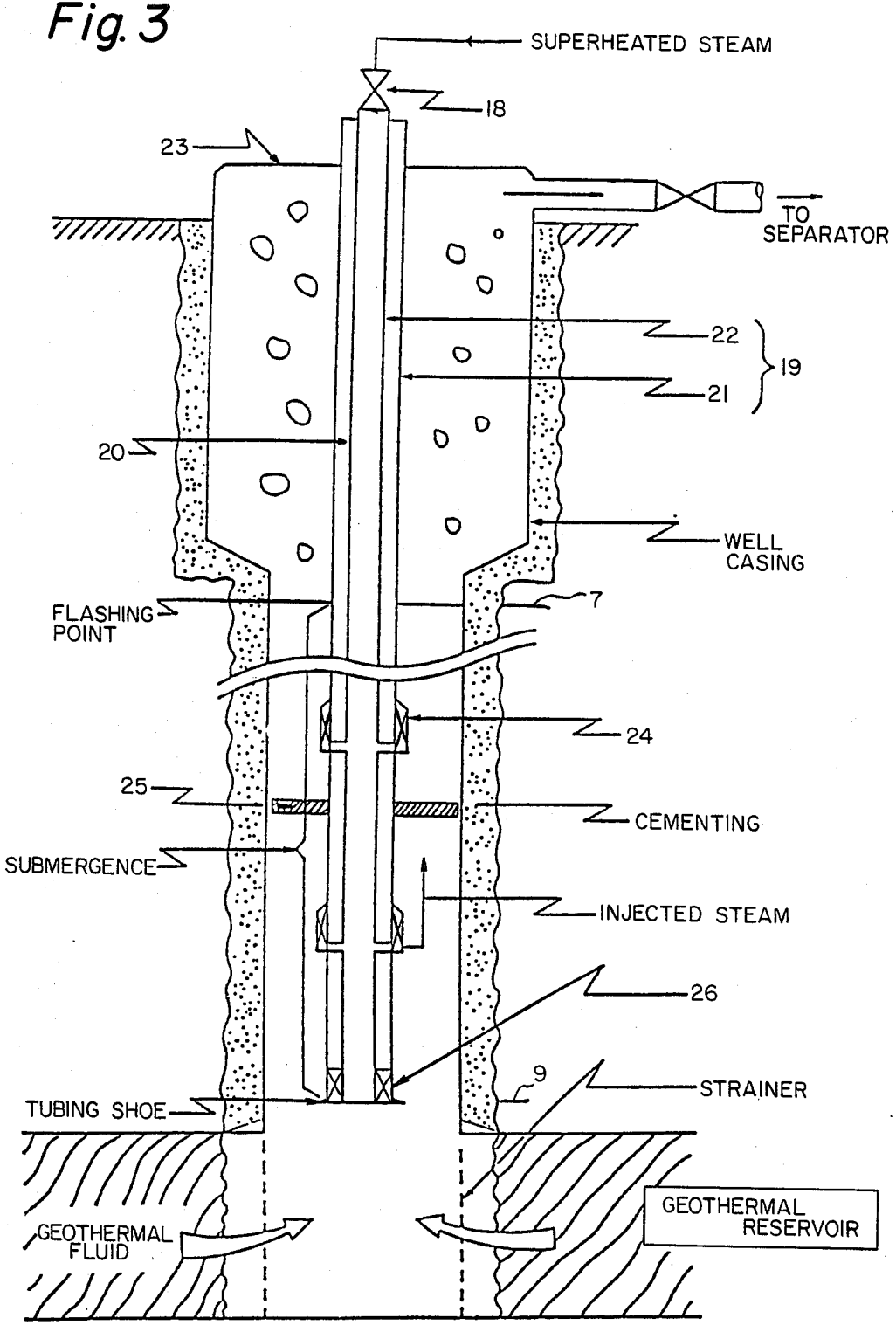

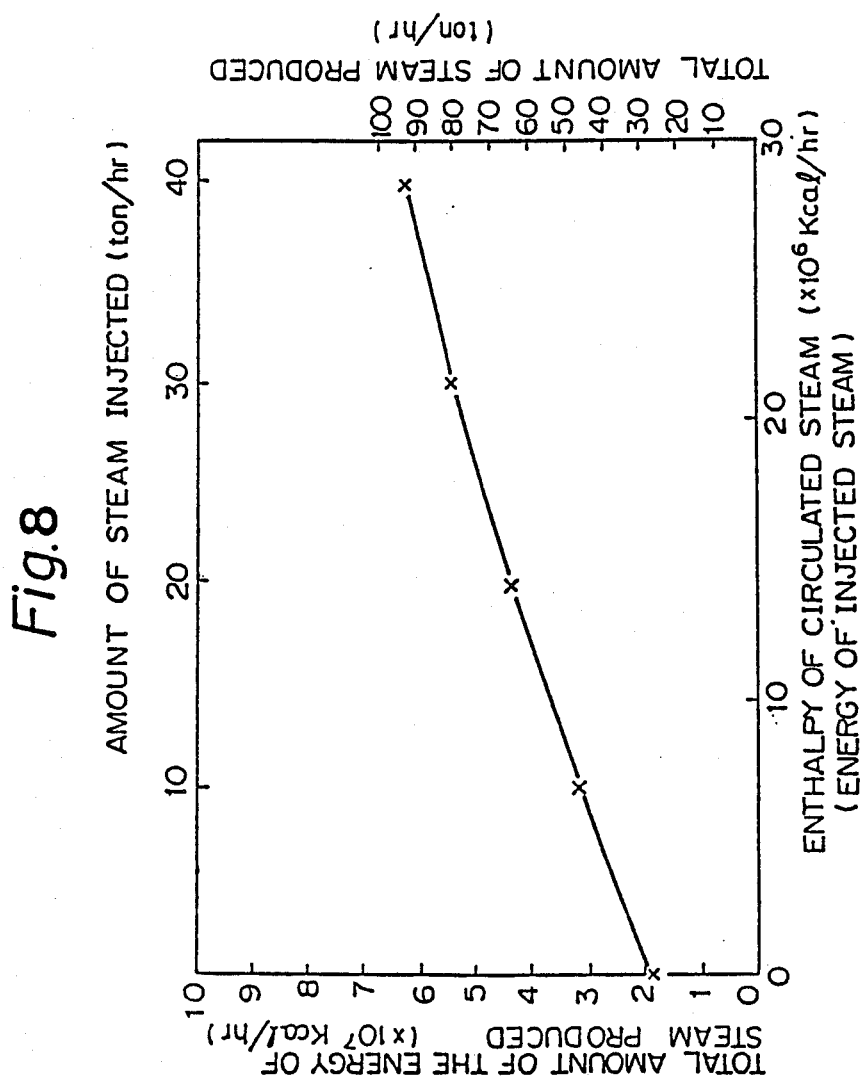

METHOD AND APPARATUS FOR EXTRACTING GEOTHERMAL FLUID

RELATED APPLICATIONS

This application is a continuation-in-part of serial number 06/930,793, filed Nov. 13, 1986, now abandoned.

BACKGROUND OF THE INVENTION

The present invention to a method and apparatus for extracting geothermal fluid.

In the wake of the recent growing interest in the utilization of geothermal energy in Japan, new technology has been established for exploring and exploiting water-dominated dominated geothermal fields and this has caused a rapid increase in the rate of development of geothermal energy in Japan which is abundant with water-dominated geothermal fields. However, the water-dominated geothermal fields in Japan have a fatal inherent defect in that the production capacity of production wells diminishes year by year.

If difficulty is expected in maintaining the desired output of electric power generation from water-dominated geothermal reservoirs as a result of decrease in the steam production at individual production wells, a practice is currently undertaken to compensate for the decrease in steam production from the existing production wells by drilling additional production wells at seemingly promising sites. However, this method is not capable of increasing the initially estimated quantity of hot water or energy that can be extracted from geothermal reservoirs. Therefore, drilling additional production wells inevitably shortens the lifetime over which steam can be produced from reservoirs.

If the quantity of hot water or energy that can be extracted from geothermal reservoirs could be increased, it would become possible to produce more steam for a longer period of time without increasing the number of production wells.

SUMMARY OF THE INVENTION

The present invention relates to a method for increasing both the capacity of a steam production well and the amount of steam that can be extracted from geothermal reservoirs. This object can be attained by injecting a heated gas into a hot water region which is located below the flashing point of connate geothermal water in a production well so as to lower the position of said flashing point within the well to thereby reduce the hydrokinetic bottom hole pressure relative to the hydrostatic bottom hole pressure.

BRIEF DESCRIPTION OF THE DRAWINGS

FIG. 3 shows an elevational cross section of a wellbore containing structure from injecting steam into the geothermal fluid;

FIG. 8 shows the relationship between the amount of steam injected into a well and the amount of steam produced from the well (well head pressure being preset at 24.7 KSCA).

DETAILED DESCRIPTION OF THE INVENTION

It is generally held that the production capacity of production wells decreases as a result of the following effects:

(1) pressure drop accompanying the steam production from geothermal reservoirs;

(2) temperature drop of the reservoir fluid; and (3) reduction of the productivity index (PI) of the well.

Among these factors, (1) the pressure drop in geothermal reservoirs and (2) the temperature drop of the reservoir fluid have been found predominant by the present investigations.

The total production rate Q of connate hot water than can be extracted from a geothermal field can be expressed basically by the following equation:

$$Q = \frac{\text{cumulative productivity index} (\Sigma PI) \times \text{pressure draw down} (P_s - P_f)}{\text{mass specific gravity of the geothermal fluid produced}} \quad (1)$$

where $P_s$ is the hydrostatic bottom hole pressure or the hydrostatic reservoir pressure and $P_f$ is the hydrokinetic bottom hole pressure.

The mass specific gravity of a fluid in a production well is a function of the temperature and pressure in the well. The reduction of the productivity index of a production well is usually small, so it may safely be concluded that the production capacity of production wells decrease chiefly because of a diminution of the bottom hole pressure draw down due to the decrease in the reservoir pressure and of a drop in the vapor/liquid ratio in the well owing to the decrease in the temperature of the reservoir fluid.

Based on this observation, the present invention increases the steam production capacity of a well by injecting a pressurized gas, more specifically, by circulating superheated steam, so as to enhance both the pressure draw down at the bottom of the well and the vapor/liquid ratio in the well.

Figure 2:
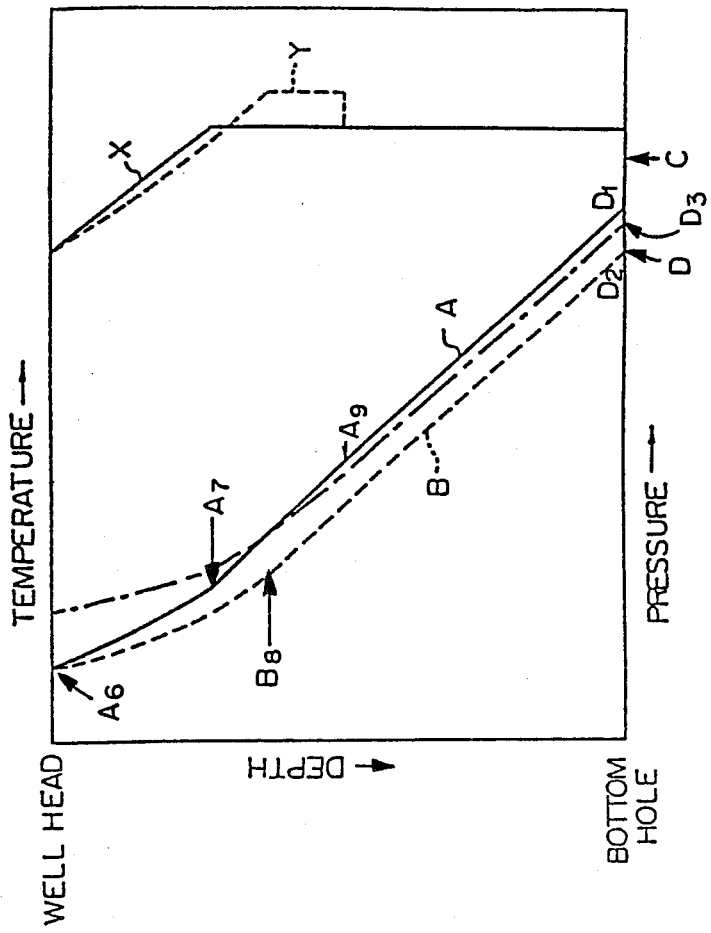
FIG. 2 is a diagram of the pressure and temperature distributions in the well illustrating the concept and operating principle for extraction of geothermal fluid in accordance with the present invention.
Figure 1:
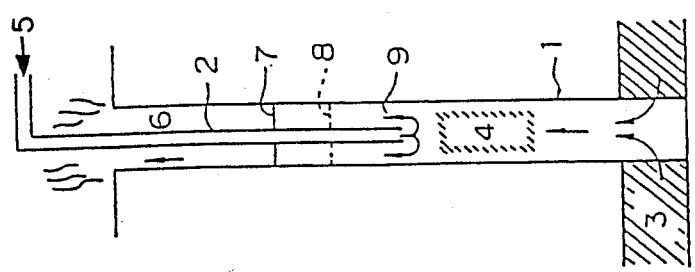
FIG. 1 shows an elevational cross section of a wellbore illustrating the concept and operating principle of the method of the present invention for extracting geothermal fluid.

The operating principle of the method of the present invention is hereunder described with reference to FIG. 1. In FIG. 1 and FIG. 2 1 is a casing; 2 is a tubing (pressurized steam injection pipe); 3 is a reservoir; 4 is hot water; 5 is pressurized superheated steam; 6 is saturated steam; 7 is the flashing point of connate geothermal water maintained prior to injection of pressurized superheated steam; 8 is a flashing point achieved after injection of pressurized superheated steam; and 9 is the point at which the steam is injected.

The tubing 2 is inserted into the well so that pressurized superheated steam 5 can be injected into hot water 4 in accordance with the present invention. This tubing 2 is not employed in the prior art method wherein hot water 4 which flows up from the reservoir 3 to ascent through the casing 1 is simply recovered as wet steam from the well head and guided to a collector. In this operation, a flashing point 7 (the surface at which hot water boils to be vaporized) forms at a certain depth which is determined by such factors as the hydrostatic bottom hole pressure of the reservoir and the temperature of the connate hot water. In the long run, the position of the flashing point will become lower as the hydrokinetic bottom hole pressure decreases but, in the actual process of extracting hot water, the position of the flashing point 7 will not experience any discernible change even if the extraction of hot water is continued for a considerable period of time. This substantially constant position of the flashing point is indicated at 7 in FIG. 1. For example, the depth of the flashing point 7 will remain virtually constant until the quantity of hot water being extracted is decreased from 300 tons/hr to about 100 tons/hr. The flashing point 7 starts to sink when the quantity of hot water being extracted has dropped to about 100 tons/hr but the degree of its subsidence is no more than a few meters below the initial level. From an economic viewpoint, it is particularly effective to apply the method of the present invention after the position of the flashing point 7 has started to decline from the initial level but it should of course be understood that in order to attain the very object of increasing the steam production rate, the method of the present invention may be applied from the start of the extracting operation.

In accordance with the present invention, the tubing 2 is inserted into the hot water 4 in the casing 1 in such a manner that the tip of the tubing is located typically several hundred meters below the initial depth of the flashing point 7. Superheated steam 5 (ca. 300°–400° C.) is then injected through the tubing 2. The pressurized superheated steam flowing out of the tip 9 of the tubing 2 is pushed back by the pressure of hot water 4 flowing up from below and immediately changes its direction to ascent together with the hot water 4 in the casing 1. In FIG. 2 the static bottom hole pressure, of the pressure of geothermal fluid that prevails before drilling a well, is indicated by point C. As soon as a well is drilled, the pressure of geothermal fluid drops to the level indicated by $D_1$, creating a fluid pressure distribution in the well under a natural flowing condition as indicated by solid line A. Point A7 on line A denotes a fluid pressure being exerted at the position corresponding to point 7 in FIG. 1 which indicates the flashing point maintained prior to the injection of pressurized superheated steam. Point A9 denotes a fluid pressure prevailing at the depth corresponding to the position 9 in FIG. 1 at which the tip of the tubing 2 is located. In order for the pressurized superheated steam to be successfully injected into connate geothermal water, the steam must have a pressure greater than the pressure at point A9. This is indeed an extreme pressure and usually the steam will not readily gush out of the tip 9 of the tube 2 unless its pressure is increased in steps with the aid of some suitable means such as kickoff valves 24 in FIG. 3. However, once the steam has started to gush out of the tubing, its sustained injection is fairly easy to achieve. As the pressure distribution in the well is as shown by curve A in FIG. 2, the fluid pressure becomes higher at depths below A9 and the injected steam will change its direction to ascent through the casing 1 in FIG. 1 together with hot water 4. This causes accelerated vaporization of the hot water in the well since the large thermal energy of the injected superheated (300°–400° C.) steam is absorbed chiefly by the hot water present at a position above the level 9 in FIG. 1 superheated steam flows out of the tubing 2. Since the well head pressure, which is indicated by A6 in FIG. 2, is maintained substantially constant at a value equal to that attained under a natural flowing condition, the increase in the thermal energy of the hot water causes a buildup in saturation pressure of the nearby area and the flashing point 7 in FIG. 1 is consequently displaced to a lower position. The new flashing point whch forms as a result of superheated steam injection is indicated at 8 in FIG. 1. The pressure distribution which is attained by superheated steam injection is shown in FIG. 2 by dashed line B. The fluid pressure which corresponds to the flashing point 8 in FIG. 1 attained by superheated steam injection is indicated by B8 in FIG. 2. The bottom hole pressure lowers to the position indicated by $D_2$. The pressures at points $D_1$ and $D_2$ are generally referred to as hydrokinetic bottom hole pressures. The temperature distribution of the fluid in the well that prevails under a natural flowing condition before superheated steam injection is shown in FIG. 2 by solid line X. Dashed line Y in FIG. 2 indicates the temperature distribution of the fluid that prevails at depths above the gushing level 9 in FIG. 1 after superheated steam injection.

As equation (1) indicates, the production rate of connate hot water from a geothermal field is proportional to the difference between hydrostatic and hydrokinetic bottom hole pressures, which may be translated to the difference between C and D in FIG. 2. Obviously, the hydrokinetic bottom hole pressure D has dropped from $D_1$ to $D_2$ as a result of superheated steam injection and the production of connate hot water is increased because $(C-D_2)>(C-D_1)$.

It is desirable to maintain the well head pressure A6 substantially constant. The quantity of hot water, $Q_1$, as it flows spontaneously into an individual well is given by the following equation (see FIG. 2):

$$Q_1 = PI(C-D_1) \qquad (2)$$

where $Q_1$: production rate (ton/hr);
PI: productivity index (ton/hr/ksc), constant;
C: hydrostatic bottom hole pressure (ksc), constant;
$D_1$: hydrokinetic bottom hole pressure (ksc).

If the well head pressure A6 in FIG. 2 during injection of a superheated steam is held constant at a value equal to that attained during spontaneous flowing, the flashing point level becomes deeper such as from 7 to 8 in FIG. 1. (i.e., the water head pressure below the flashing point level decreases) and the hydrokinetic bottom hole pressure decreases. If the hydrokinetic bottom hole pressure at this time is written as $D_2$, the quantity of hot water $Q_2$ which flows into the well is shown as equation (3).

$$Q_2 = PI(C-D_2) \qquad (3)$$

Subtracting equation (2) from equation (3), we obtain:

$$Q_2 - Q_1 = PI(C - D_2) - PI(C - D_1) = PI(D_1 - D_2). \quad (4)$$

Since $D_1 > D_2$, therefore, $Q_2$ is greater than $Q_1$.

If the well head pressure is not held constant during injection of superheated steam, the density of hot water above the point of superheated steam injection ($A_9$) decreases to cause a corresponding decrease in the hydrokinetic bottom hole pressure and an increase in the well head pressure (as indicated by the one-long-and-one-short dashed line in FIG. 2). Since this decrease in the hydrokinetic bottom hole pressure is solely due to the change in the density of hot water, the amount of this decrease is smaller than that occurring when the well head pressure is held constant. In other words, if the hydrokinetic bottom hole pressure occurring in the absence of any control over the well head pressure is written as $D_3$ indicated in FIG. 2, then $D_3 > D_2$. The quantity of connate hot water extracted from the reservoir in this case is given by:

$$Q_3 = PI(C - D_3) \quad (5)$$

Subjecting equation (5) from equation (3), we obtain:

$$Q_2 - Q_3 = PI(C - D_2) - PI(C - D_3) = PI(D_3 - D_2) > 0$$

Therefore, $D_3$ is greater than $D_2$ and $_2$ is greater than $Q_3$. In other words, the quantity of hot water that can be recovered from a geothermal reservoir can be increased by maintaining a constant well head pressure.

It should be mentioned here that if the well head pressure is not controlled to be constant during injection of superheated steam, the pressures at various points above the injection point ($A_9$) are higher than those attained when wheel head pressure is held constant (see the curve drawn by a one-long-and-one-short dashed line in FIG. 2). This conclusion also holds true with the pressures in the two-phase region above the flashing point level. Therefore, the vapor-to-liquid ratio of the steam in the two-phase region is decreased in consideration of the characteristics of hot water undergoing an isoenthalpic change.

Theoretically, the method of the present invention may be implemented even if injected steam is replaced by any other appropriate pressurized hot gas but, in practical applications, part of the steam produced is preferably circulated for injection because it will preclude the entrance of any undesirable gas into the product steam and enable efficient energy utilization. Therefore, the method of the present invention, when taken in a broad sense, may be described as a steam enhanced circulation (SEC) lifting system. The SEC system is intended for achieving a high steam production rate by injecting an appropriate pressurized superheated steam into the hot water region in a production well (FIG. 1). In accordance with this system, an appropriate pressurized superheated steam is injected, while the well head pressure of a production well drilled into a water-dominated geothermal reservoir is held constant at a value equal to that attained under a natural flowing condition, into a hot water region below the flashing point of the hot water in the well so as to lower the level of said flashing point in the well, with the result that the pressure of water head in the well (i.e., the hydrokinetic bottom hole pressure) relative to the pressure of the geothermal reservoir fluid (i.e., the hydrostatic bottom hole pressure) is sufficiently reduced to enhance both the extraction of connate water and the production of steam at the well head.

In practicing the method of the present invention, if a double-walled tubing with an appropriate heat insulating material enclosed between the inner and outer tubes is placed in a casing such as that shown in FIG. 3, cumulative usage of energy can be achieved by injecting part of the saturated steam product after it has been pressurized to an adequately high pressure level. FIG. 3 is a schematic drawing showing the internal construction of the well to be used for injecting superheated steam into the well. Many other alternative internal construction patterns are conceivable for the well which may enable superheated steam to gush out into the hot water region of the well. However, since the present invention is applicable on only to a case where a new well is to be developed but also to a case where it is required to enhance the production of saturated steam from an existing well whose productivity has significantly declined or from which steam production has almost stopped, the internal construction of the well as shown in FIG. 3 is considered to be the most practical. This construction will not require reconstruction of the well. It, therefore, offers such advantages as easy setting, simple maintenance, and low cost.

Pressurized superheated steam produced with a compressor by adiabatically compressing part of the product steam is injected into the inside of the double-walled tubing 19 through a valve 18 shown in FIG. 3. This double-walled tubing 19 having a suitable diameter consists of an outer tubing 21 and an inner tubing 22 and an appropriate heat insulating material 20 is enclosed in the annulus between the outer and inner tubings. This double-walled tubing 19 is inserted into the casing of the production well, with the top of the tubing being fixed to a casing head 23 provided in the well head, the bottom of the tubing being located at a predetermined depth in the well. The use of heat insulating material 20 is required for the purpose of preventing heat loss of superheated steam which is passed through the inside of the double-walled tubing 19. This heat insulating material 20 may consist of an appropriate liquid or an appropriate solid or a combination of both. Asbestos is preferred. A kickoff valve 24 may, when necessary, be installed at an appropriately selected depth in the double-walled tubing 19 in order to lower the starting pressure at which injection of superheated steam is started. A centralizer 25 is installed on the double-walled tubing 19 for the purpose of holding it in the central area of the casing and also so as to prevent vibration of the tubing 19. A check valve 26 is installed at the bottom of the tubing at a level corresponding to 9 in FIG. 1 so as to prevent the inflow of geothermal fluid into the tubing.

Figure 4:
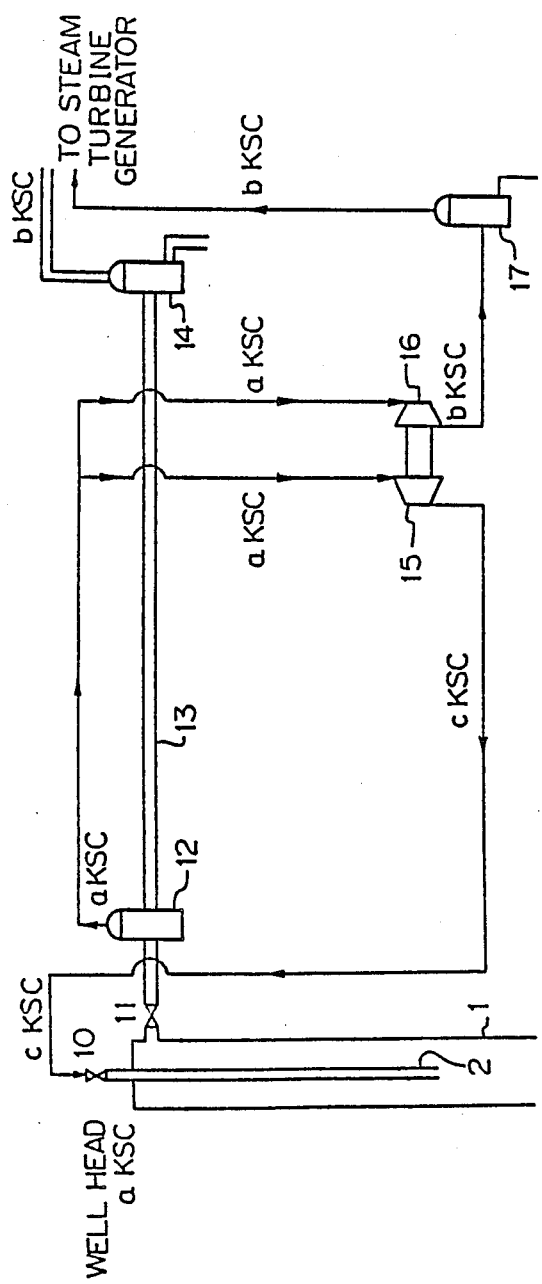
FIG. 4 is a schematic drawing of a steam enhanced circulation system which is a preferred embodiment of the present invention.

A preferable embodiment of this circulation system is shown in FIG. 4. While a steam turbine compressor 15 is used to pressurize the saturated product steam, the turbine 16 itself may be driven with part of the saturated steam produced at the well head. In geothermal power generating systems currently in operation, the pressure at the head of a production well a KSC is higher than the pressure of the steam b KSC that is fed to a turbine generator (not shown), so that the product steam must be expanded by depressurization through a separator 14 before it is employed for power generation. Therefore, if the pressure at the exhaust side of the steam turbine used for pressurizing the steam to be injected into tubing 2 is set to the value b KSC that is attainable by the separator 14, the product steam that has passed through said steam turbine 16 can be directly used for the purpose of electric power generation (not shown). In other words, the amount of energy that will be lost to the outside of the system operating based on this approach is virtually negligible except for the portion regarding the efficiency of the steam turbine compressor 15.

FIG. 4 shows the concept of a steam enhanced circulation system suitable for use in the practice of the present invention: 1 is a casing; 2 is a tubing through which pressurized superheated steam is injected; 10 is a valve at the well head connecting to the tubing 2; 11 is a valve position at the well head for recovery of the product steam; 12 is a separator; 13 is a steam pipeline; 14 is a separator; 15 is a compressor; 16 is a turbine; 17 is a separator; a, b and c represent the pressures at respective positions; and KSC signifies kg/cm². A major portion of the product steam is transported through the pipeline 13 and expanded by depressurization to b kg/cm² in the separator 14 before it is fed to a steam turbine generator (not shown). Another part of the product steam is withdrawn at a pressure of a kg/cm² from the separator 12 through the other outlet; part of the withdrawn steam is used to drive the turbine 16 while the remainder is pressurized to c kg/cm² in the compressor 15 and sent to the well head from which it is injected into hot water region through the valve 10 and tubing 2. The steam which has been used to drive the turbine 16 is discharged at b kg/cm² and, after being passed through the separator 17, is combined with the product steam, which is separated through separator 14, being sent to the turbine generator (not shown) at a pressure of b kg/cm². By controlling the respective pressures in such a manner that c>a>b, the process of steam extraction can be operated with the least energy loss.

Figure 6:
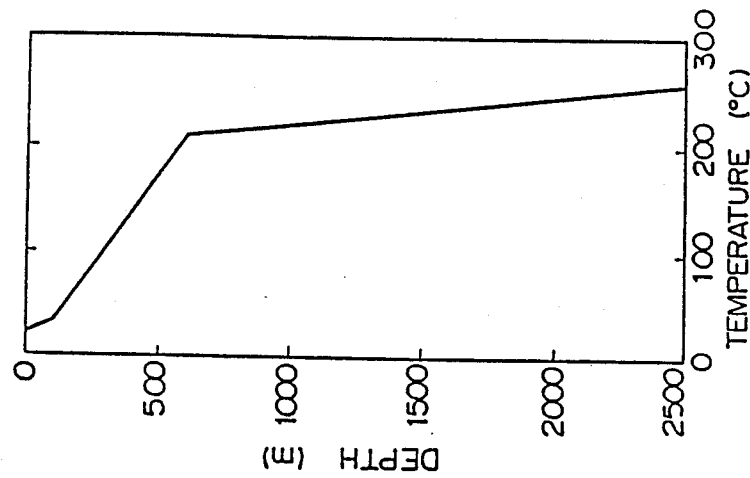
Figure 5:
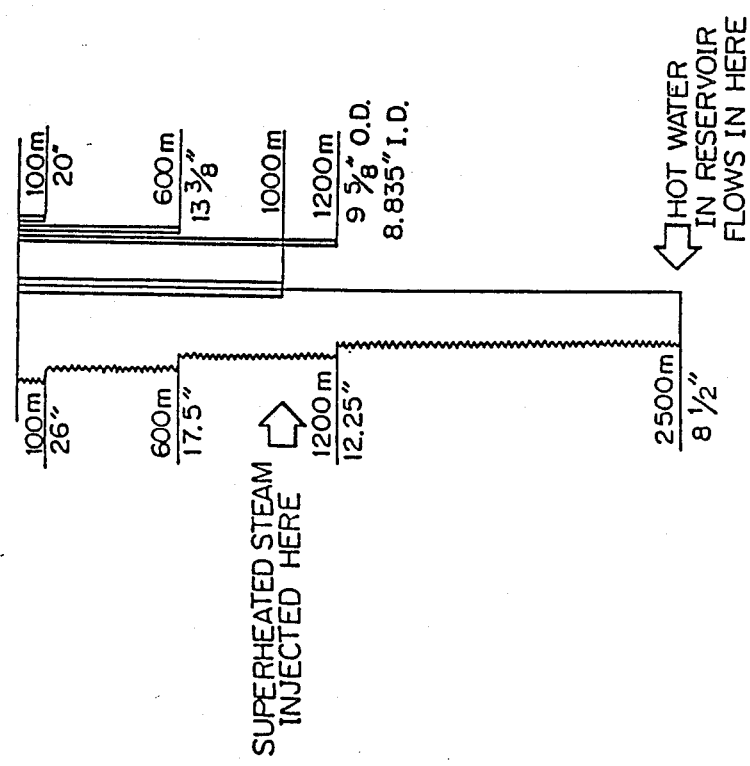
FIG. 5 shows the dimensions of casing set in the well and utilized for calculations by FIG. 6 shows the temperature distribution of a reservoir around the well of FIG. 5.
Figure 7:
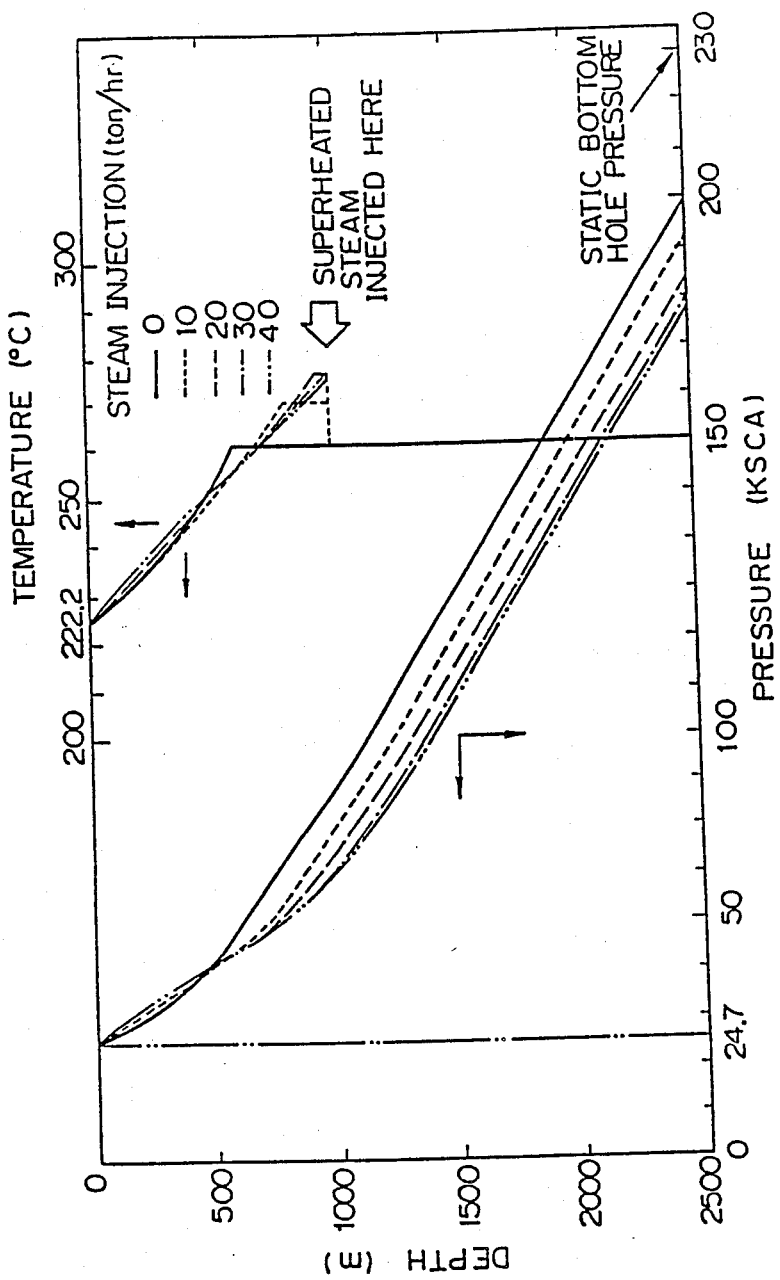
FIG. 7 shows the pressure and temperature distributions in the well (well head pressure preset at 24.7 KSCA) that were generated from the calculations by simulation.

The advantages that could be attained by applying the method of the present invention to geothermal steam extraction on a commercial scale were estimated by computer simulation with a steam-water two-phase vertical flow calculating simulator GEOVER. FIGS. 5 and 6 show the casing in the well and the temperature distribution of a reservoir around the well, respectively, both of which were inputted for a calculation by simulation. Table 1 lists the other input conditions. The simulator was also programmed to calculate the amount of heat that would be lost from the well to the nearby reservoir but, in the five cases of simulation, the total production rate at the well head was very high (>300 tons/hr) and the resulting heat loss was negligible. In four of the five cases, steam was injected at rates of 10, 20, 30 and 40 tons/hr, respectively. The simulated distributions of pressures and temperatures within the well are shown in FIG. 7, and details of the results of calculations by simulation are given in Table 2. According to FIG. 7, two-phase states were formed at the steam injected depth when the injection rates were 30 and 40 tons/hr. The data in Table 2 are shown graphically in FIG. 8 from which one can see the total amount of steam produced increases with increasing steam injection. However, as column 15 in Table 2 shows, the rate of increase in the amount of energy generation decreases with increasing steam injection. This is particularly true when the amount of steam injection is increased from 30 pl tons/hr to 40 tons/hr. When a two-phase state is created at the steam injected depth, in deeper areas than this depth only hot water exists and the subsequent change in the pressure of water head in the production well would be too small to achieve a marked increase in the total amount of steam production from the reservoir. The validity of this assumption is supported by the fact that the pressure profile for steam injection at rates of 30 tons/hr and 40 tons/hr are almost identical to each other. It can therefore be concluded that the increase in the total amount of the energy of steam that is produced by injecting 40 tons/hr of steam is due only to the thermal energy provided by the injected steam.

As FIG. 7 and Table 2 show, by injecting superheated steam into hot water in a production well in accordance with the method of the present invention, the flashing point of hot water is displaced to a deeper position and the productivity of the reservoir is significantly increased.

It has also been demonstrated that by incorporating the SEC system into the method of the present invention, the amount of hot water or energy that can be extracted from a geothermal reservoir is increased and at the same time the amount of steam feed to a turbine generator can be increased with less energy consumption.

It is of course imperative that before applying the SEC system to a real geothermal reservoir, its characteristics should be fully investigated and selection be made for most economically feasible specifications of a production well, gas to be injected, depth at which the gas is injected, amount of gas injection, tubing through which the gas is injected, and heat insulating material.

TABLE 1

| Input Data for Calculation | |
|---|---|
| Reservoir | |
| Productivity index | 10 ton/hr KSC |
| hydrostatic bottom hole pressure | 230 KSCA |
| temperature of hot water inflow from reservoir | 260° C. |
| heat conductivity of reservoir rock | 2 Kcal/m/hr/°C. |
| density of reservoir rock | 2500 kg/m³ |
| specific heat of reservoir rock | 0.24 Kcal/kg/°C. |
| Production well | |
| depth of the bottom hole | 2500 m |
| inside diameter of open hole | 21.59 cm (8.5 inch) |
| inside diameter of casing | 22.44 cm (8.835 inch) |
| Well head | |
| pressure | 24.7 KSCA (5.0 KSCA) |
| saturation temperature for the present pressure | 222.2° C. (151.11° F.) |
| Steam injection | |
| depth of injection | 1000 m (2000 m) |
| steam temperature | 330° C. (330° C.) |

TABLE 2

Injected steam vs. product steam (at a well head pressure of 24.7 KSCA)

| (1) amount of steam injected | (2) specific enthalpy of injected steam | (3) amount of energy of injected steam (enthalpy of circulated steam) (1) × (2) | (4) total amount of connate water produced from reservoir | (5) total amount of fluid produced at well head (1) + (4) | (6) specific enthalpy of connate water produced from reservoir | (7) total amount of energy produced from reservoir (4) × (6) | (8) total amount of energy produced at well head (3) + (7) |
|---|---|---|---|---|---|---|---|

TABLE 2-continued

| Injected steam vs. product steam (at a well head pressure of 24.7 KSCA) | | | | | | | |
|---|---|---|---|---|---|---|---|
| (ton/hr) | (Kcal/kg) | (Kcal/hr) | (ton/hr) | (ton/hr) | (Kcal/kg) | (Kcal/hr) | (Kcal/hr) |
| 0 | — | — | 300 | 300 | 270.8 | $8.124 \times 10^7$ | $8.124 \times 10^7$ |
| 10 | 705.56 | $0.706 \times 10^7$ | 379 | 389 | 270.8 | $10.263 \times 10^7$ | $10.969 \times 10^7$ |
| 20 | 710.43 | $1.421 \times 10^7$ | 443 | 463 | 270.8 | $11.996 \times 10^7$ | $13.417 \times 10^7$ |
| 30 | 713.43 | $2.140 \times 10^7$ | 483 | 513 | 270.8 | $13.080 \times 10^7$ | $15.220 \times 10^7$ |
| 40 | 714.52 | $2.858 \times 10^7$ | 498 | 538 | 270.8 | $13.486 \times 10^7$ | $16.344 \times 10^7$ |

| (1) amount of steam injected (ton/hr) | (9) specific enthalpy at well head (8)/(5) (Kcal/kg) | (10) steam quality at well head | (11) total amount of steam produced (5) × (10) (ton/hr) | (12) steam specific enthalpy at well head (Kcal/kg) | (13) total amount of energy of product steam (11) × (12) (Kcal/hr) | (14) net amount of energy of product steam (13) − (3) (Kcal/hr) | (15) increase in the amount of energy produced as a result of steam injection (14) − $1.953 \times 10^7$ (Kcal/hr) |
|---|---|---|---|---|---|---|---|
| 0 | 270.80 | 0.0973 | 29.19 | 668.894 | $1.953 \times 10^7$ | $1.953 \times 10^7$ | 0 |
| 10 | 281.98 | 0.1226 | 47.69 | 668.894 | $3.190 \times 10^7$ | $2.484 \times 10^7$ | $5.320 \times 10^6$ |
| 20 | 289.79 | 0.1403 | 64.96 | 668.894 | $4.345 \times 10^7$ | $2.924 \times 10^7$ | $9.717 \times 10^6$ |
| 30 | 296.68 | 0.1560 | 80.02 | 668.894 | $5.353 \times 10^7$ | $3.213 \times 10^7$ | $12.602 \times 10^6$ |
| 40 | 303.79 | 0.1721 | 92.59 | 668.894 | $6.193 \times 10^7$ | $3.335 \times 10^7$ | $13.827 \times 10^6$ |

What is claimed is:

1. A method of extracting geothermal fluid from a production well comprising the steps of:
    injecting an injection steam into a hot water region below a flashing point depth of connate hot water in the well,
    providing said injection steam to the connate hot water at a temperature and pressure higher than the temperature and pressure, respectively, of the connate hot water at said hot water region, and
    maintaining well head pressure of the well substantially constant at a value equal to that attained during a natural flowing condition,
    whereby injecting of said injection steam into the connate hot water at the hot water region displaces the flashing point depth to a deeper level and lowers the hydrokinetic bottom hole pressure relative to the hydrostatic bottom hole pressure so that the rate of steam production at the well head is increased,
    separating steam produced at the well head so that it is divided into a first portion having a pressure of a kg/cm², and a second portion having a pressure of b kg/cm²,
    further dividing said first portion into third and fourth portions each having a pressure of a kg/cm²,
    adiabatically compressing said third portion in a compressor to create a fifth portion having a pressure of c kg/cm²,
    using said fourth portion as a power source for driving the compressor with a driving turbine, said turbine discharging a sixth portion having a pressure of b kg/cm², and
    adjusting the respective pressures so that c>a>b, to thereby allow the fifth portion having a pressure of c kg/cm² to be continuously injected into the connate water below the initially formed flashing point depth while combining the second and sixth portions each having a pressure of b kg/cm² to be continuously fed into a steam turbine generator.

2. The method of claim 1, wherein said injection steam is superheated steam.

3. The method of claim 2, wherein the superheated steam has a temperature between 300°–400° C.

4. An apparatus for extracting geothermal fluid from a well comprising:

(I) a superheated steam injecting mechanism which comprises
    (i) a double-walled tubing for injecting superheated steam that is inserted into the casing of a steam production well, the top of said tubing being fixed to a casing head installed at the well head while the bottom of said tubing is located at a predetermined depth, the annulus of said tubing being packed with an appropriate heat insulating material;
    (ii) kickoff valves installed at appropriately selected depths and including selectively operable means which may be actuated to lower the pressure at which the injection of superheated steam from said tubing bottom into the well is started; and
    (iii) the casing head by which said double-walled tubing is fixed to the well head;
(II) a production mechanism for circulating steam which comprises
    (i) steam separating means for separating product steam produced at the well head into a first portion having a pressure of a kg/cm² and a second portion having a pressure of b kg/cm² with a>b, and for further separating said first portion into third and fourth portions each having a pressure of a kg/cm²; and
    (ii) steam compressor means, which is driven by said fourth portion, for adiabatically compressing said third portion to create a fifth portion to be injected into the well by the steam injecting mechanism, said fifth portion having a pressure of c kg/cm², with c>a, said compressor means having a driving means from which a sixth portion having a pressure of b kg/cm² is discharged and combined with the second portion and continuously fed into a steam turbine generator;
(III) means for maintaining the well head pressure of the well substantially constant at a value equal to that attained during a natural flowing condition; and
(IV) a process means for processing all of the available product steam except that which is subjected to enhanced circulation through the well to the state where it has a sufficient degree of dryness to be used industrially.

* * * * *